US010235876B2

(12) United States Patent
Yeh et al.

(10) Patent No.: US 10,235,876 B2
(45) Date of Patent: Mar. 19, 2019

(54) TRAFFIC NETWORK RELIABILITY EVALUATING METHOD AND SYSTEM THEREOF

(71) Applicant: National Tsing Hua University, Hsinchu (TW)

(72) Inventors: Wei-Chang Yeh, Hsinchu (TW); Ming-Jian Zuo, Alberta (CA)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 15/660,985

(22) Filed: Jul. 27, 2017

(65) Prior Publication Data
US 2018/0336779 A1    Nov. 22, 2018

(30) Foreign Application Priority Data
May 17, 2017    (TW) .............................. 106116307 A

(51) Int. Cl.
G06G 7/76    (2006.01)
G06F 15/18    (2006.01)
(Continued)

(52) U.S. Cl.
CPC ............ *G08G 1/012* (2013.01); *G08G 1/0133* (2013.01); *G08G 1/0145* (2013.01)

(58) Field of Classification Search
None
See application file for complete search history.

(56) References Cited

U.S. PATENT DOCUMENTS

2002/0120389 A1 *    8/2002  Fushiki ................ G08G 1/0104
                                                             701/117
2008/0071466 A1 *    3/2008  Downs ................. G08G 1/0104
                                                             701/117
(Continued)

FOREIGN PATENT DOCUMENTS

CN    103606266    2/2014
CN    104575074    4/2015
(Continued)

OTHER PUBLICATIONS

"Office Action of Taiwan Counterpart Application," dated Oct. 18, 2017, p. 1-p. 8, in which the listed references were cited.

*Primary Examiner* — Adam D Tissot
(74) *Attorney, Agent, or Firm* — JCIPRNET

(57) ABSTRACT

A method and a system of evaluating traffic network reliability adapted to a traffic route network with sub-routes are provided. The method includes obtaining a connecting configuration, threshold distribution values, a state distribution value of each sub-route; enumerating at least one path according to a maximal threshold value of the traffic route network, the connection configuration and the threshold distribution values of each sub-route wherein each path is composed of a plurality of the sub-routes and includes threshold distribution values corresponding to each sub-route, wherein if a specific path is not composed of a specific sub-route, a threshold distribution value of the specific path corresponding to the specific sub-route is 0; and calculating a difference between user-side network reliability value and system-side network reliability of the traffic route network based on the threshold distribution values corresponding to each sub-route of each path and the state distribution value of each sub-route.

14 Claims, 3 Drawing Sheets

(51) Int. Cl.
  *G06G 7/00*   (2006.01)
  *G08G 1/01*   (2006.01)

(56) References Cited

U.S. PATENT DOCUMENTS

2012/0035839 A1   2/2012   Stehle et al.
2015/0338228 A1   11/2015  Hsieh

FOREIGN PATENT DOCUMENTS

| TW | 200804768 | 1/2008 |
| TW | 201102838 | 1/2011 |
| TW | 201219749 | 5/2012 |
| TW | I505669 | 10/2015 |
| TW | 201701614 | 1/2017 |

\* cited by examiner

TRAFFIC NETWORK RELIABILITY EVALUATING METHOD AND SYSTEM THEREOF

CROSS-REFERENCE TO RELATED APPLICATION

This application claims the priority benefit of Taiwan application serial no. 106116307, filed on May 17, 2017. The entirety of the above-mentioned patent application is hereby incorporated by reference herein and made a part of this specification.

BACKGROUND

Field of the Invention

The invention relates to a traffic analyzing method and more particularly, to a method of evaluating traffic network reliability and a system using the same.

Description of Related Art

Traffic network planning is closely related to people in modern life, and how to improve traffic issues, such as traffic jams, through traffic network planning is continuously an important task of government agencies. Generally speaking, the conventional traffic network planning aims at enhancing a system-side reliability of a traffic network, i.e., enhancing the overall reliability in an aspect of a service provider. However, the system-side reliability cannot reflect what users have perceived, which unfortunately, leads to people perceiving nothing in traffic improvement after the related government department, on the premise to improve the system-side reliability, has completed the budgeting and plan in traffic. Therefore, how to develop a system capable of objectively evaluating system-side reliability and user-side reliability has become an imperative for people skilled in this field.

SUMMARY

Accordingly, the invention provides a method of evaluating traffic network reliability and a system using the same, which utilizes a multi-flow network concept to respectively calculate a user-side network reliability and a system-side network reliability of a traffic network and compare the two for the government administrator's more objective reference in traffic constructions or planning of existing traffic route improvement projects.

A method of evaluating traffic network reliability of the invention is adapted to a traffic route network with a start point, an end point and a plurality of sub-routes. The method includes the following steps. A plurality of threshold distribution values of each of the sub-routes, a connecting configuration of each of the sub-routes and a state distribution value of each of the sub-routes are obtained. At least one path is enumerated according to a maximal threshold value of the traffic route network, the connecting configuration and the threshold distribution values of each of the sub-routes. Each of the paths starts from the start point and ends at the end point, and each of the paths is composed of multiple of the sub-routes and includes threshold distribution values corresponding to each of the sub-routes. When a specific path is not composed of a specific sub-route, a threshold distribution value of the specific path corresponding to the specific sub-route is 0. A difference between a user-side network reliability value and a system-side network reliability value of the traffic route network is calculated based on the threshold distribution values corresponding to each of the sub-routes of each of the paths and the state distribution value of each of the sub-routes.

A traffic network reliability evaluating system of the invention is adapted to a traffic route network with a start point, an end point and a plurality of sub-routes. The traffic network reliability evaluating system includes an input unit, a storage unit and a processing unit. The input unit is configured to set a connecting configuration of each of the sub-routes of the traffic route network, a plurality of threshold distribution values of each of the sub-routes and a state distribution value of each of the sub-routes. The storage unit is coupled to the input unit and configured to store the connecting configuration of each of the sub-routes of the traffic route network, the threshold distribution values of each of the sub-routes and a state distribution value of each of the sub-routes. The processing unit is coupled to the input unit and the storage unit. The processing unit is configured to enumerate at least one path according to a maximal threshold value of the traffic route network, the connecting configuration and the threshold distribution values of each of the sub-routes. Each of the paths starts from the start point and ends at the end point, and each of the paths is composed of multiple of the sub-routes and includes threshold distribution values corresponding to each of the sub-routes. When a specific path is not composed of a specific sub-route, a threshold distribution value of the specific path corresponding to the specific sub-route is 0. The processing unit calculates a difference between a user-side network reliability value and a system-side network reliability value of the traffic route network based on the threshold distribution values corresponding to each of the sub-routes of each of the paths and the state distribution value of each of the sub-routes.

To sum up, the evaluating traffic network reliability method and system of the invention utilize the "multi-flow network" concept to respectively calculate the user-side network reliability and the system-side network reliability of the traffic route network and compare the two. Each sub-route in the traffic network has different threshold distribution values. The threshold distribution values are equivalent to traffic flows in real life and equivalent to different states as the situations varies, which is the "multi-flow" concept of the invention, unlike each sub-route having a single state in the conventional traffic network planning. The difference between the user-side network reliability and the system-side network reliability calculated according to the method and the system of the embodiments of the invention can be provided for the government administrator's more objective reference to contribute to taking both the overall system side and the user side into account in traffic constructions or planning of existing traffic route improvement projects, such that the traffic budget which has been invested can be well utilized.

In order to make the aforementioned and other features and advantages of tine invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
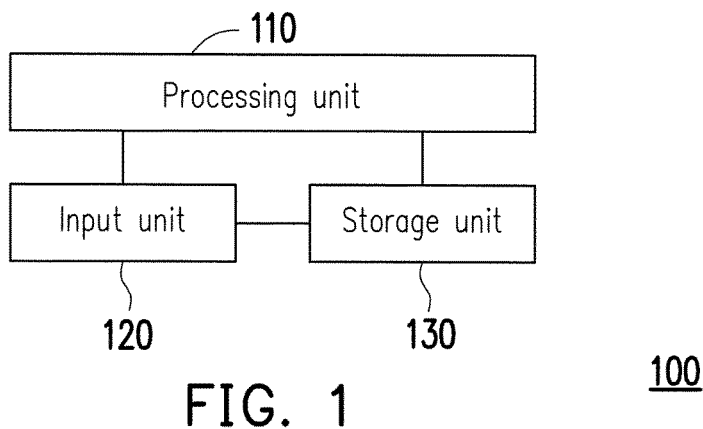
FIG. 1 is a schematic diagram illustrating a traffic network reliability evaluating system according to an embodiment of the invention.

FIG. 1 is a schematic diagram illustrating a traffic network reliability evaluating system according to an embodiment of the invention. Referring to FIG. 1, a traffic network reliability evaluating system 100 includes a processing unit 110, an input unit 120 and a storage unit 130. The processing unit 110 is coupled to the input unit 120 and the storage unit 130, and the storage unit 130 is coupled to the input unit 120.

The input unit 120 includes input devices, for example, a keyboard, a mouse and a touch panel. The input unit 120 is configured to receive various information related to a traffic route network which is input by a user, and the information includes a connecting configuration of each sub-route in the traffic route network, a plurality of threshold distribution values of each sub-route, a state distribution value of each sub-route and so on.

The storage unit 130 is, for example, a random access memory (RAM) configured to store the aforementioned information related to the traffic route network which is obtained from the input unit 120. The storage unit 130 may also be configured to store algorithms, modular programs or processing programs associated with computations of the embodiments of the invention employed for being read and executed by the processing unit 110.

The processing unit 110 may be a central processing unit (CPU) or other programmable general purpose or special purpose microprocessor, digital signal processor (DSP), programmable controller, application specific integrated circuit (ASIC) or other similar devices or a combination of the above devices.

Figure 2:
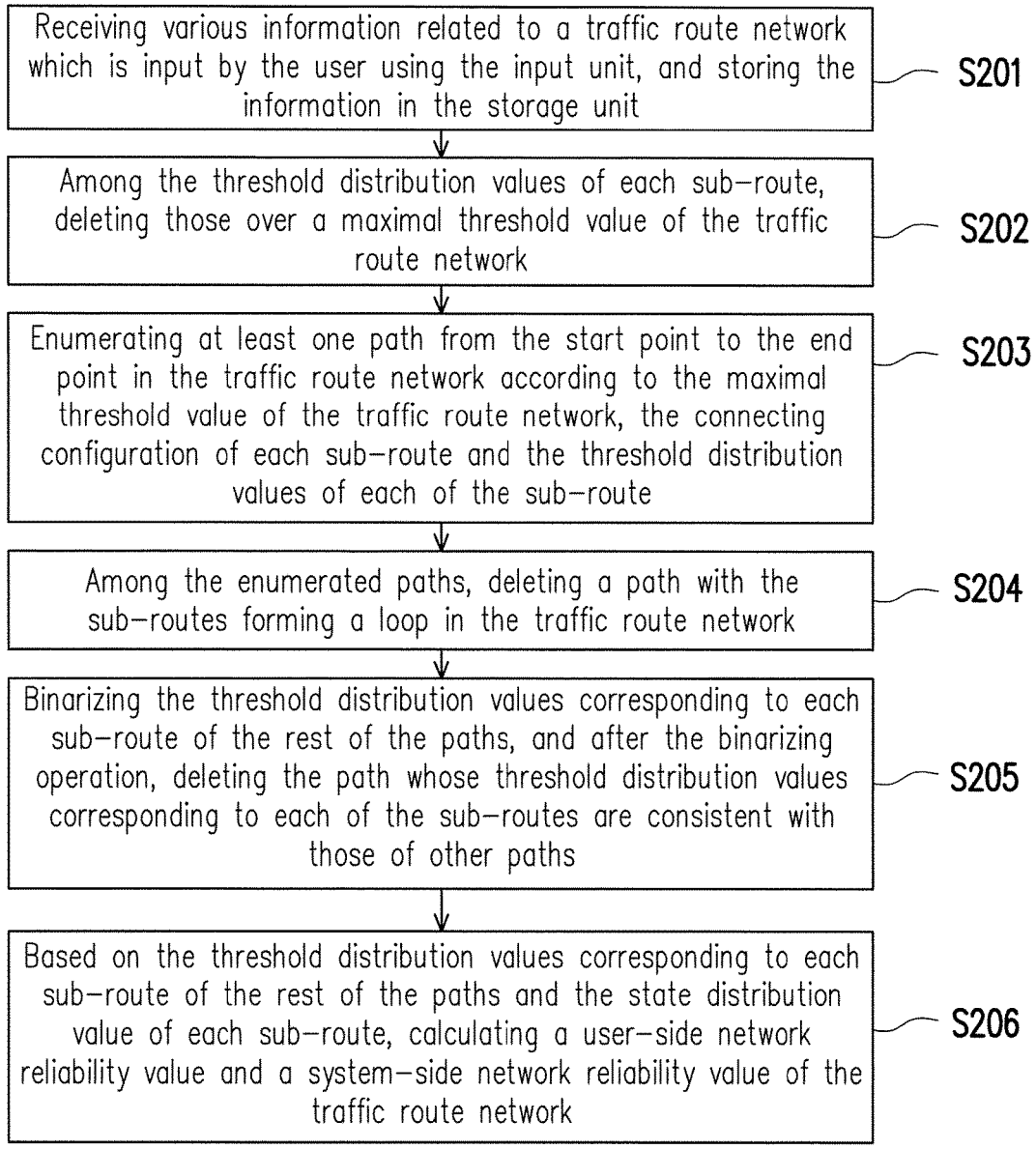
FIG. 2 is a flowchart illustrating a method of evaluating traffic network reliability according to an embodiment of the invention.

FIG. 2 is a flowchart illustrating a method of evaluating traffic network reliability according to an embodiment of the invention. Referring to FIG. 2, first, in step S201, the input unit 120 receives various information related to a traffic route network which is input by the user, and the storage unit 130 stores the information. Before receiving the information input by the user, the input unit 120 may receive a command sent from the processing unit 110. This command is employed to notify the input unit 120 to start to receive the input from the user. The information related to the traffic route network received by the input unit 120 includes a connecting configuration of each sub-route in the traffic route network, threshold distribution values of each sub-route and a state distribution value of each sub-route. The threshold distribution values are, for example, various traffic flow threshold values of the sub-routes, and the state distribution value is, for example, a traffic jam probability of each sub-route. Each sub-route includes various threshold distribution values and a state distribution value indicating one of two states (i.e., a traffic-jam state and a non-traffic jam state). The connecting configuration of each sub-route in the traffic route network is, for example, a travelling direction of a certain sub-route and another two sub-routes respectively connected with the start and the end points of the aforementioned sub-route which are stored in a specific data structure. The information is stored in the storage unit 130 for being read and subsequently processed by the processing unit 110.

Then, step S202 is entered, where among the threshold distribution values of each sub-route, those over a maximal threshold value of the traffic route network are deleted. The maximal threshold value of the traffic route network is, for example, a maximum traffic flow from a start point to an end point in the traffic route network. The maximal threshold value may be a value preset by the traffic network reliability evaluating system 100, or may be one input by the user with the input unit 120 in step S201, which is not limited in the invention. Since each sub-route includes a plurality of threshold distribution values, the threshold distribution values over the maximal threshold value are deleted in this step, and step S203 is entered.

In step S203, at least one path from the start point to the end point in the traffic route network is enumerated according to the maximal threshold value of the traffic route network, the connecting configuration of each sub-route and the threshold distribution values of each of the sub-routes. Each enumerated path may be represented by a vector, and each tuple in the vector represents a threshold distribution value of each sub-route in the path. For example, in a traffic route network with 4 sub-routes, each path may be expressed by vector $X=(x_1, x_2, x_3, x_4)$, where $x_1$ to $x_4$ respectively represent threshold distribution values of corresponding sub-routes. If a specific path is not composed of a specific sub-route, i.e., the specific sub-route is not included in the specific path, a tuple of the specific path corresponding to the specific sub-route (which is a threshold distribution value corresponding to the specific route) is 0. For example, in a scenario where a vector representing a specific path is $X=(x_1, x_2, x_3, 0)$, and $x_1$ to $x_3$ are not 0, it represents that the path is composed of only three sub-routes corresponding to the former three tuples, but not composed of the sub-route corresponding to the forth tuple. Meanwhile, in this enumeration, a conservation law of flow must be considered according to the connecting configuration among the sub-routes. The conservation law of flow means that threshold distribution values from other sub-routes entering a start point of a specific sub-route must be consistent with threshold distribution values flowing from an end point of the same sub-routes. In this case, the path enumeration may be performed by various algorithms for solving a minimal path problem, for example, a depth first search (DFS) algorithm, a breadth first search (BFS) algorithm, a branch and bound algorithm, a method of exhaustion or the like.

Then, step S204 is entered, where among the enumerated paths, a path with the sub-routes forming a loop in the traffic route network is deleted. In some conditions, the connecting configuration of the sub-routes may cause a path passing through one node repeatedly, but pedestrians or drivers in real life do not walk or drive in this way, therefore, such path has to be deleted.

After the path forming the loop is deleted, step S205 is entered, where the threshold distribution values corresponding to each sub-route of the rest of the paths are binarized, and after the binarizing operation, the path whose threshold distribution values of each of the sub-routes are consistent with those of other paths is deleted. Briefly speaking, taking the vector for representing the path set forth in the description related to step S203 for example, each tuple in the vector corresponds to different threshold distribution values of the sub-routes, and the binarizing operation is to set the tuples which are not 0 in the vector to 1. In this way, vectors for representing all the paths are set as vectors in which each tuple is only 0 or 1. Based on the connecting configuration of all the sub-routes and the limitation of the maximal threshold value of the traffic route network, the paths enumerated in step S203 may include paths composed of the same sub-routes, but only the threshold distribution values corresponding to each of the sub-routes are different. Once the binarizing operation is performed on the threshold distribution values of the sub-routes, the aforementioned difference no longer exists, and the repeated paths may be removed.

Finally, step S206 is entered, where based on the threshold distribution values corresponding to each sub-route of the rest of the paths and the state distribution value of each sub-route, a user-side network reliability value and a system-side network reliability value of the traffic route network are calculated. Up to this step, the rest of the paths are aggregated, so as to obtain a set of the sub-routes which the user may pass through. A network reliability of the traffic route network is calculated based on the sub-route set, which is, for example, a non-traffic jam probability value from the start point to the end point in the present embodiment and may be employed as a user-side network reliability. An overall network reliability of the traffic route network is calculated based on the state distribution values of all the sub-routes according to an inclusion-exclusion principle, which is, for example, a non-traffic jam probability value from the start point to the end point and may be employed as a system-side network reliability. Thereby, the user-side network reliability and the system-side network reliability may be compared.

In order to make the embodiments of the invention more comprehensible, embodiments are provided below to describe the method of evaluating traffic network reliability in detail.

Figure 3:
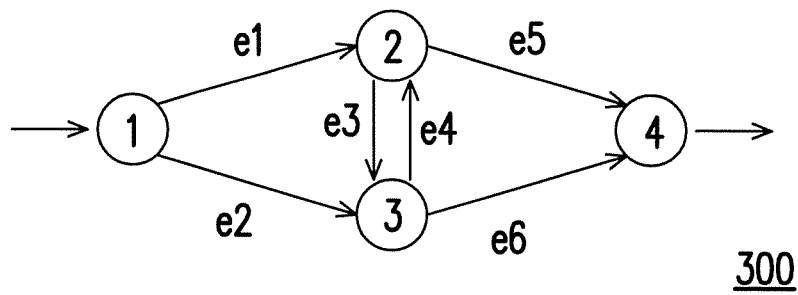
FIG. 3 is a schematic diagram illustrating a traffic route network in the method of evaluating traffic network reliability according to an embodiment of the invention.

FIG. 3 is a schematic diagram illustrating a traffic route network in the method of evaluating traffic network reliability according to an embodiment of the invention. Referring to FIG. 2 and FIG. 3, a traffic route network 300 totally include 4 nodes and 6 sub-routes. A node 1 is a start point of the traffic route network 300, a node 4 is an end point of the traffic route network 300, and vehicle travelling directions of sub-routes $e_1$ to $e_6$ and a connecting configuration among the sub-routes are illustrated in FIG. 3. In step S201, information related to the traffic route network 300 is obtained by an input operation performed by the user with the input unit 120.

In step S201, the information related to the traffic route network 300 obtained by the input operation performed by the user with the input unit 120 also includes a state distribution value and a plurality of threshold distribution values of each sub-route in the traffic route network 300. In the present embodiment, Table 1 and Table 2 below respectively show the state distribution value and the threshold distribution values of each sub-route in the traffic route network 300.

TABLE 1

| State | Sub-route | | | | | |
| --- | --- | --- | --- | --- | --- | --- |
| | $e_1$ | $e_2$ | $e_3$ | $e_4$ | $e_5$ | $e_6$ |
| traffic jam | 0.1 | 0.08 | 0.05 | 0.07 | 0.1 | 0.15 |
| No traffic jam | 0.9 | 0.92 | 0.95 | 0.93 | 0.9 | 0.85 |

TABLE 2

| | Sub-route | | | | | |
| --- | --- | --- | --- | --- | --- | --- |
| | $e_1$ | $e_2$ | $e_3$ | $e_4$ | $e_5$ | $e_6$ |
| Threshold distribution value | 0 | 0 | 0 | 0 | 0 | 0 |
| | 1 | 1 | 2 | 3 | 2 | 1 |
| | 2 | 2 | 3 | 5 | 5 | 4 |
| | 3 | 4 | 4 | | | |

In the present embodiment, the state distribution value of each sub-route (referring to Table 1) is a traffic-jam/non-traffic jam probability value of each sub-route. Each sub-route has a plurality of threshold distribution values (referring to Table 2), and in the present embodiment, the threshold distribution values are unit traffic flows of the sub-routes.

Then, step S202 is entered, where among the threshold distribution values of each sub-route, those over a maximal threshold value of the traffic route network 300 are deleted. In the present embodiment, the maximal threshold value of the traffic route network 300 is set to 4, namely, a maximum traffic flow to reach an end point of the traffic route network 300 from a start point thereof is 4 units. In Table 2, each of the sub-routes $e_4$ and $e_5$ has a threshold distribution value of 5 units, which is over the maximal threshold value of the traffic route network 300 in the present embodiment. Thus, the two columns are deleted, and Table 2 is updated as Table 3 as follows.

TABLE 3

| | Sub-route | | | | | |
| --- | --- | --- | --- | --- | --- | --- |
| | $e_1$ | $e_2$ | $e_3$ | $e_4$ | $e_5$ | $e_6$ |
| Threshold distribution value | 0 | 0 | 0 | 0 | 0 | 0 |
| | 1 | 1 | 2 | 3 | 2 | 1 |
| | 2 | 2 | 3 | ~~5~~ | ~~5~~ | 4 |
| | 3 | 4 | 4 | | | |

After the processing of step S202 is completed, step S203 is entered, where at least one path from the start point to the end point of the traffic route network 300 is enumerated according to the maximal threshold value of the traffic route network 300, a connecting configuration of each sub-route and the threshold distribution values of each sub-route (referring to Table 3). An algorithm for the enumeration is, for example, a DFS algorithm, a BFS algorithm, a branch and bound algorithm, a method of exhaustion or the like, and for descriptive convenience, detailed steps thereof are omitted. As described above, each enumerated path may be expressed by vector $X=(x_1, x_2, x_3, x_4, x_5, x_6)$, where $x_1$ to $x_6$ respectively represent threshold distribution values corresponding to the sub-routes $e_1$ to $e_6$. Referring to FIG. 3, since the sub-routes in each path have to satisfy the conservation law of flow, according to the connecting configuration and the vehicle travelling directions of the sub-routes $e_1$ to $e_6$, $x_1$ to $x_6$ have to satisfy the following formulas:

$$x_1 + x_2 = 4 \quad (1)$$

$$x_5 + x_6 = 4 \quad (2)$$

$$x_1 - x_5 = x_3 - x_4 \quad (3)$$

$$x_2 - x_6 = x_4 - x_3 \quad (4)$$

Based on formula (1) to formula (4) set forth above, total 4 paths may be enumerated, and the 4 paths are respectively illustrated in FIG. 4A to FIG. 4D, where a path 410 is (2, 2, 2, 0, 0, 4), a path 420 is (0, 4, 0, 0, 0, 4), a path 430 is (3, 1, 3, 0, 0, 4), and a path 440 is (0, 4, 3, 3, 0, 4).

Figure 4A:
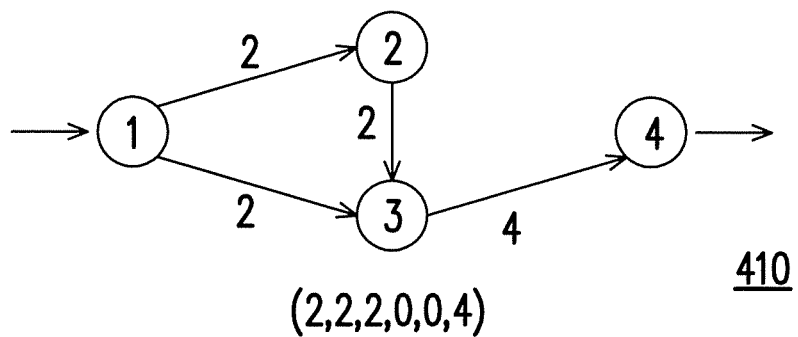
FIG. 4A to FIG. 4D are schematic diagrams illustrating the enumerated paths in an exemplary traffic route network according to an embodiment of the invention.
Figure 4B:
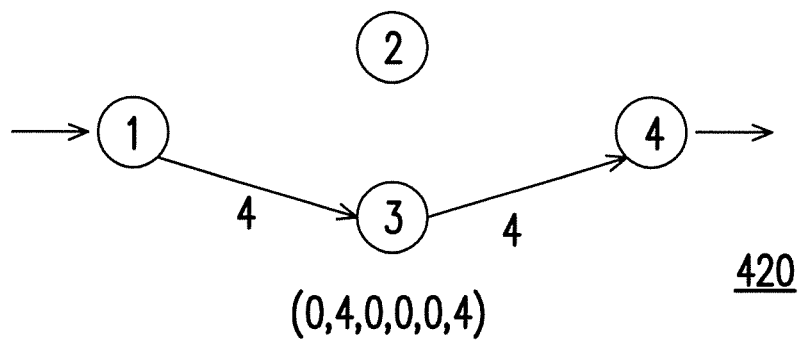
Figure 4C:
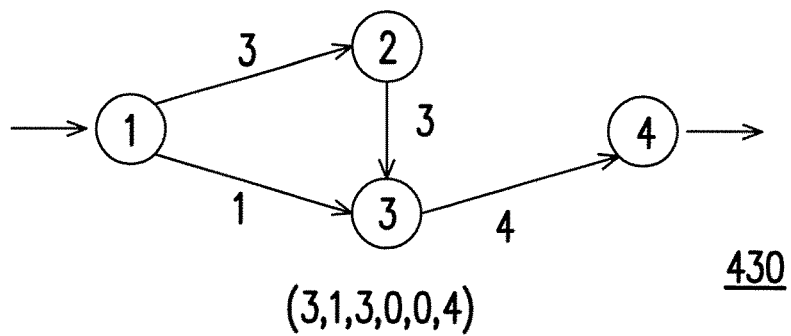
Figure 4D:
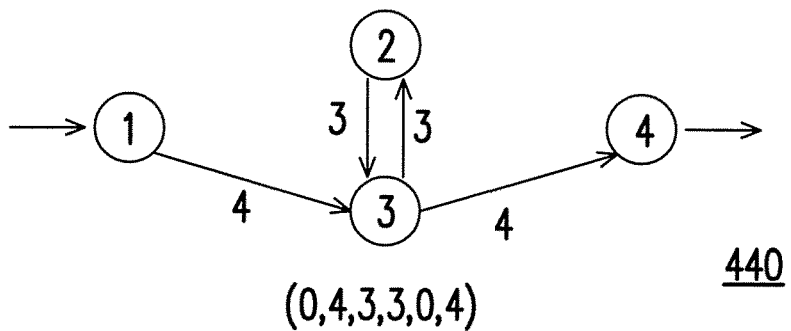

Then, step S204 is entered, in the enumerated paths, each sub-route forming a loop in the traffic route network 300 is deleted. Referring to FIG. 4D, the path 440 passing through the sub-route $e_2$ reaches a node 3, reaches node 2 and then returns to node 3 sequentially along the sub-routes $e_4$ and $e_3$, thereby forming a loop, obviously. However, the user usually does not travel in this way, and thus, the path 440 has to be deleted in this case. Herein, no more sub-routes included in the rest of the paths form any loop in the traffic route network 300, and thus, step S205 is entered.

In step S205 the threshold distribution values corresponding to each sub-route of the rest of the paths are binarized, and after the binarizing operation, the path whose threshold distribution values corresponding to each of the sub-routes are consistent with those of other paths is deleted. Therein, the threshold distribution values of each sub-route included in the path 420 after being binarized are changed from (0, 4, 0, 0, 0, 4) to (0, 1, 0, 0, 0, 1), the threshold distribution values of each sub-route included in the path 430 after being binarized are changed from (3, 1, 3, 0, 0, 4) to (1, 1, 1, 0, 0, 1), and the threshold distribution values of each sub-route included in the path 410 are changed from (2, 2, 2, 0, 0, 4) to (1, 1, 1, 0, 0, 1). It may be found that the threshold distribution values of each sub-route included in the path 410 and the path 430 after being binarized are exactly the same, and thus, the duplicate path 430 is deleted.

Figure 5:
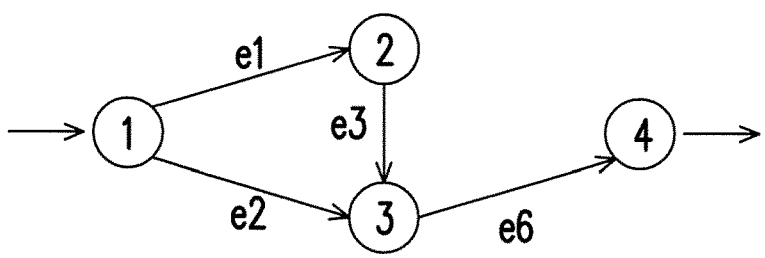
FIG. 5 is a schematic diagram illustrating a set of sub-routes which the user may pass through after each enumerated path of the traffic route network is aggregated according to an embodiment of the invention.

Finally, step S206 is entered, where based on the threshold distribution values corresponding to each sub-route of the rest of the paths and the state distribution value of each sub-route, a user-side network reliability value and a system-side network reliability value of the traffic route network 300 are calculated. Also referring to FIG. 5, in this case, FIG. 5 is a schematic diagram illustrating a set of sub-routes which the user may pass through after the path 410 and the path 420 are aggregated according to the present embodiment. The vector for representing the path 410 after being binarized is (1, 1, 1, 0, 0, 1), wherein the sub-routes corresponding to the threshold distribution values which are not 0 are $e_1$, $e_2$, $e_3$ and $e_6$, and the vector for representing the path 420 after being binarized is (0, 1, 0, 0, 0, 1), wherein the sub-routes corresponding to the threshold distribution values which are not 0 are $e_2$ and $e_6$. Thus, in an aspect of the user side, only the sub-route $e_1$, the sub-route $e_2$, sub-route $e_3$ and the sub-route $e_6$ are used. Then, a user-side network reliability of the traffic route network 300 may be calculated according to the sub-route set. In the present embodiment, the network reliability is a probability value that no traffic jam occurs from the node 1 (i.e., the start point) to the node 4 (i.e., the end point) in the condition that the maximal threshold value of the traffic route network 300 is 4 units. In a scenario that the path 410 is considered, all the threshold distribution values corresponding to the sub-routes $e_1$, $e_2$, $e_3$ and $e_6$ of the path 410 are not 0, and thus, a non-traffic jam probability of the path 410 calculated according to Table 1 is 0.9×0.92× 0.95×0.85=0.66861. In a scenario that the path 420 is considered, both the threshold distribution values corresponding to the sub-routes $e_2$ and $e_6$ are not 0, while the threshold distribution values corresponding to the sub-routes $e_1$ and $e_3$ are 0, thus, the sub-routes corresponding to the threshold distribution values of 0 are considered in a traffic-jam state, and a non-traffic jam probability of the path 420 calculated according to Table 1 is 0.1×0.92×0.05× 0.85=0.00391. Finally, by summing up the two values, the user-side network reliability of the traffic route network 300 is 0.66861+0.00391=0.67252.

On the other hand, the overall network reliability of the traffic route network 300 is calculated according to the state distribution value of all the sub-routes of the traffic route network 300 based on the inclusion-exclusion principle and may be employed as the system-side network reliability, which is the probability value that no traffic jam occurs from the node 1 to the node 4 in the traffic route network 300. This value calculated according to the inclusion-exclusion principle may be 0.975945, where the detailed calculation process is omitted for descriptive convenience.

It may be found in the calculation in step S206 that the system-side network reliability of the traffic route network 300 is 0.975945, which is different from the user-side network reliability of 0.67252 obtained in the condition that the maximal threshold value of the traffic route network 300 is 4 units, and this difference can be provided to the traffic authority for reference in project implementation.

In light of the foregoing, the evaluating traffic network reliability method and system of the invention utilize the multi-flow network concept to respectively calculate the user-side network reliability and the system-side network reliability of the traffic route network and compare the two, so as to provide the comparison for the government administrator's more objective reference in traffic constructions or planning of existing traffic route improvement projects, thereby expecting to take both the overall system side and the user side into account.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method of evaluating traffic network reliability, adapted to a traffic route network with a start point, an end point and a plurality of sub-routes, the method comprising:

obtaining, by an input unit, a plurality of threshold distribution values of each of the sub-routes, a connecting configuration of each of the sub-routes and a state distribution value of each of the sub-routes;

enumerating, by a processing unit, at least one path according to a maximal threshold value of the traffic route network, the connecting configuration and the threshold distribution values of each of the sub-routes, wherein each of the paths starts from the start point and ends at the end point, and each of the paths is composed of multiple of the sub-routes and comprises the plurality of threshold distribution values of each of the sub-routes, determining, by the processing unit, the plurality of threshold distribution value of a specific path is 0 if the specific path is not composed of the specific sub-route;

binarizing, by the processing unit, the plurality of threshold distribution values of each of the sub-routes of each of the paths;

deleting, by the processing unit, the path whose threshold distribution values of each of the sub-routes are determined as consistent with those of other paths according to the binarizing operation; and providing, by the processing unit, a difference between a user-side network reliability value and a system-side network reliability value of the traffic route network based on the plurality of threshold distribution values of each of the sub-routes of each of the paths and the state distribution value of each of the sub-routes.

2. The method according to claim 1, wherein each of the sub-routes of each of the paths satisfies a conservation law of flow.

3. The method according to claim 1, wherein the plurality of threshold distribution values of each of the sub-routes of each of the paths are not over the maximal threshold value.

4. The method according to claim 1, further comprising: when multiple of the sub-routes constituting the specific path form a loop in the traffic route network, deleting the specific path.

5. The method according to claim 1, wherein the step of calculating the difference between the user-side network reliability value and the system-side network reliability value of the traffic route network based on the plurality of threshold distribution values of each of the sub-routes of each of the paths and the state distribution value of each of the sub-routes comprises:
  calculating the network reliability value of the traffic route network based on the plurality of threshold distribution values of each of the sub-routes of each of the paths and the state distribution value of each of the sub-routes to serve it as the user-side network reliability value;
  calculating the network reliability value of the traffic route network based on the state distribution value of each of the sub-routes according to an inclusion-exclusion principle to serve as the system-side network reliability value; and
  calculating the difference between the system-side network reliability value and the user-side network reliability value.

6. The method according to claim 1, wherein the plurality of threshold distribution values of each of the sub-routes are vehicle traffic flows of each of the sub-routes.

7. The method according to claim 1, wherein the state distribution value of each of the sub-routes is a traffic jam probability value of each of the sub-routes.

8. A traffic network reliability evaluating system, adapted to a traffic route network with a start point, an end point and a plurality of sub-routes, the system comprising:
  an input unit, configured to set a connecting configuration of each of the sub-routes of the traffic route network, a plurality of plurality of threshold distribution values of each of the sub-routes and a state distribution value of each of the sub-routes;
  a storage unit, coupled to the input unit and configured to store the connecting configuration of each of the sub-routes of the traffic route network, the plurality of threshold distribution values of each of the sub-routes and the state distribution value of each of the sub-routes; and
  a processing unit, coupled to the input unit and the storage unit and configured to:
  enumerate at least one path according to a maximal threshold value of the traffic route network, the connecting configuration and the plurality of threshold distribution values of each of the sub-routes,
  determine the plurality of threshold distribution value of a specific path is 0 if the specific path is not composed of the specific sub-route,
  binarize the plurality of threshold distribution values of each of the sub-routes of each of the paths,
  delete the path whose threshold distribution values of each of the sub-routes are determined as consistent with those of other paths according to the binarizing operation and
  provide a difference between a user-side network reliability value and a system-side network reliability value of the traffic route network based on the plurality of threshold distribution values of each of the sub-routes of each of the paths and the state distribution value of each of the sub-routes,
  wherein each of the paths starts from the start point and ends at the end point, and each of the paths is composed of multiple of the sub-routes and includes the plurality of threshold distribution values of each of the sub-routes.

9. The system according to claim 8, wherein each of the sub-routes of each of the paths satisfies a conservation law of flow.

10. The system according to claim 8 wherein the plurality of threshold distribution values of each of the sub-routes of each of the paths are not over the maximal threshold value.

11. The system according to claim 8, wherein when multiple of the sub-routes constituting the specific path form a loop in the traffic route network, the specific path is deleted.

12. The system according to claim 8, wherein the operation of the processing unit calculating the difference between the user-side network reliability value and the system-side network reliability value of the traffic route network based on the plurality of threshold distribution values of each of the sub-routes of each of the paths and the state distribution value of each of the sub-routes comprises:
  calculating the network reliability value of the traffic route network based on the plurality of threshold distribution values of each of the sub-routes of each of the paths and the state distribution value of each of the sub-routes to serve it as the user-side network reliability value;
  calculating the network reliability value of the traffic route network based on the state distribution value of each of the sub-routes according to an inclusion-exclusion principle to serve as the system-side network reliability value; and
  calculating the difference between the system-side network reliability value and the user-side network reliability value.

13. The system according to claim 8, wherein the plurality of threshold distribution values of each of the sub-routes are vehicle traffic flows of each of the sub-routes.

14. The system according to claim 8, wherein the state distribution value of each of the sub-routes is a traffic-jam probability value of each of the sub-routes.

* * * * *